(12) United States Patent
Sung

(10) Patent No.: US 6,317,440 B1
(45) Date of Patent: *Nov. 13, 2001

(54) DEVICE AND METHOD FOR TRANSMITTING DIGITAL AUDIO AND VIDEO DATA

(75) Inventor: Kwan-soo Sung, Seoul (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 08/911,081

(22) Filed: Aug. 14, 1997

(30) Foreign Application Priority Data

Sep. 6, 1996 (KR) ................................................. 96-38700

(51) Int. Cl.⁷ ........................................................ H04J 3/07
(52) U.S. Cl. .................................................... 370/505
(58) Field of Search .................................. 370/503, 505, 370/506, 520, 522, 468

(56) References Cited

U.S. PATENT DOCUMENTS

| | | | |
|---|---|---|---|
| 5,065,397 | * 11/1991 | Shiobara | 370/509 |
| 5,504,757 | 4/1996 | Cook et al. | |
| 5,640,392 | * 6/1997 | Hayashi | 370/395 |
| 5,682,384 | 10/1997 | Zarros | |
| 5,710,773 | * 1/1998 | Shiga | 370/512 |
| 5,845,152 | * 12/1998 | Anderson et al. | 370/398 |
| 5,933,430 | * 8/1999 | Osakabe et al. | 370/463 |
| 6,088,366 | * 7/2000 | Sung | 370/505 |
| 6,122,280 | * 9/2000 | Hamai et al. | 370/222 |

* cited by examiner

Primary Examiner—Melvin Marcelo
Assistant Examiner—Phuongchau Ba Nguyen
(74) Attorney, Agent, or Firm—Sughrue, Mion, Zinn, Macpeak & Seas, PLLC

(57) ABSTRACT

A communication device and method for transmitting digital audio and video data in an isochronous communication mode, which satisfies specifications for SD-format digital interface in a transmission device using an isochronous transmission mode such as IEEE 1394 digital data transmission and reception, including: transmission time controlling means for controlling a point of time for transmitting source packets and empty packets in order to convert the transmission timing of an inner bus of a digital device to a timing predesignated in the transmission specification; a memory for storing the source packets; and a transmitter for inserting and transmitting the empty packets according to the control by said transmission time controlling means while the source packets stored in said memory are transmitted according to the control.

23 Claims, 6 Drawing Sheets

DEVICE AND METHOD FOR TRANSMITTING DIGITAL AUDIO AND VIDEO DATA

BACKGROUND OF THE INVENTION

1. Field of the Invention

The present invention relates to a communication device for transmitting digital audio and video data in an isochronous communication mode. More specifically, when digital audio and video data according to a standard definition (SD) is transmitted to another digital data device, the invention decides whether to transmit an empty packet or a DIF source packet for respective isochronous cycles, and controls transmission of the packets, whereby the invention is capable of transmitting digital audio and video data at a uniform data transfer rate in a predetermined margin.

2. Description of the Related Art

Development of computer technology in recent years introduced a digital multimedia era by linking computers with electronic home appliances. The computer technology allowing development of digital multimedia growth includes (a) improved technology of various digital multimedia equipment such as digital video cassette recorders (VCR) and digital camcorders and (b) interface technology which enables the multimedia equipment to be linked with each other. One of the most well-known interfaces is the IEEE 1394 interface. The IEEE 1394 interface is a standard bus interface definition conventionally used to network personal computers, portable computers and other digital systems which operate independently.

FIG. 1 is a block diagram of a multimedia system for data-communication with a digital camcorder using the IEEE 1394 interface. The multimedia system includes (1) a camera 11 for recording real world images and generating audio and/or video signals, (2) a signal processor 12 for processing the signals and producing audio and/or video information, (3) error correcting code means (FCC) 13 for appending error correcting code to the audio and/or video information, (4) a deck 14 for storing the information, (5) an interface 15 for interfacing the system 10 with another multimedia system 20 to provide mutual communication and (6) communicating means 17, which may be implemented by IEEE 1394 for performing digital communication between the multimedia systems 10 and 20. The data communication between the components of the multimedia system 10 is performed through inner bus 16.

When a frame is transmitted on the inner bus 16 during a bus interval, the inner bus 16 exhibits a high transfer rate at specific parts of the interval and stays idle during other parts to provide efficient audio and video data transmission within the device. The characteristics of the bus system are well known to those skilled in this art.

FIG. 2 shows a model of transmission of a stream of source packets from one digital device to another. A source packet may be split into 1, 2, 4 or 8 data blocks, and zero or more data blocks are contained in an IEEE 1394 isochronous packet. A receiver of the packet collects the data blocks in the isochronous packet and combines them to reconstruct the source packet for delivery to the application.

The source packets should be modified to comply with both the specification and the definitions for IEEE 1394 and DVC DIF(digital video cassette digital interface) to allow transmission from one digital device (e.g., a digital camcorder 10 shown in FIG. 1) to another digital device (e.g., a multimedia device 20 shown in FIG. 1). These IEEE 1394, SD specifications and definitions are commonly known by those skilled in this art so that only a few brief comments are sufficient before describing the operation of the present invention.

[Definition 1] Data transmission according to Standard Definition-Video Cassette Recorder Digital InterFace(SD-VCR DIF) should be applied with the following time conditions.

① Start timing information of one frame should be transmitted to the receiver. The start timing information is carried in CIP header in the source packet of the frame, as time stamp information. The CIP header is placed at the beginning of the data field of an IEEE 1394 isochronous packet and contains information on the type of the real time data contained in the data field following the CIP header.

② An $n^{th}$ data block of an $M^{th}$ video frame should be transmitted in a packet which meets the following conditions. (n=0 ··· K−1)

Packet_arrival_time_L<$T_n$ $T_n$-Transmission_delay_limit<Packet_arrival_time_F where $T_n$ is the nominal timing for data block n, $$T_n=T_M-(T_{M+1}-T_M)*n/K$$

Packet_arrival_time_L: The cycle time when the last bit of the packet which includes data block n arrives in the receiver.

Packet_arrival_time_F: The cycle time when the first bit of the packet which includes data block n arrives in the receiver.

$T_M$ is the time stamp for video frame M.

Transmission_delay_Limit=450 $\mu$s

K is the number of source packets in a video frame. For example,

K=250(525–60 system)

K=300(625–50 system)

The time conditions for frame transmission are generally described above. More detailed specifications are described in the Digital Interface and the CIP Header in the Blue Book of SD-VCR, published in December, 1995.

From the above definition, it is noted that the 250 or 300 source packets should be uniformly distributed in a fixed margin to allow data transmission between digital data devices.

[Definition 2] Isochronous transmission of IEEE 1394 operates by transmitting isochronous packets, responding to a cycle sync every 125 $\mu$s as shown in FIG. 3. Detailed specifications on the IEEE 1394 are described in the standard published in 1995.

FIG. 4 shows the state of the inner bus 16 during transmission of one frame of data. As set forth above, the inner bus of the digital camcorder 10 usually has a high transfer rate at only specific parts in the frame.

The following observations are derived from the above definitions.

In the case of the 525–60 system (i.e., National Television System Committee: NTSC), the number of source packets is 250 per frame and the number of cycle sync per frame is approximately 266.9. As a result, in the 525–60 system, empty packets without data should be allocated to 16 or 17 isochronous cycles in order to transmit image information of a frame through the IEEE 1394 bus. Accordingly, the timing of the inner bus of the digital camcorder should be synchronized with the output timing through the IEEE 1394 bus. The empty packet insertion is to be determined to conform with [Definition 1, ②].

In order to synchronize the transfer rate of the inner bus of digital devices (e.g., a camcorder) and the transfer rate of IEEE 1394 bus under [Definition 1, ②], the steps of buffering transmission data using a memory, for example, and controlling the output timing of the transmission data from the memory are required.

SUMMARY OF THE INVENTION

An object of the present invention is to provide transmission in accordance with definitions of the SD-format digital interface in communication devices with an isochronous communication mode like the digital data transmission and reception definitions of IEEE 1394.

To achieve the above and other objects, the device for transmitting digital audio and video data according to the present invention includes: transmission time controlling means for controlling a point of time for transmitting source packets and empty packets in order to convert the transmission timing of an inner bus of a digital device to a timing predesignated in the communication standard; a memory for storing the source packets; and a transmitter for inserting and transmitting the empty packets according to the control by the transmission time controlling means while the source packets stored in the memory are transmitted according to the above controlling means.

Preferably, the transmission time controlling means includes: a timing simulator for receiving predetermined signals and mode signals for transmitting a stream of the source packets, and outputting transmission basis signals corresponding to the predetermined signals and the mode signals; a transmission timing controller for receiving the transmission basis signals and cycle sync generated at each predetermined time periods, and generating controlled output for transmitting the packets in accordance with predetermined conditions.

To achieve the above and other objects, the method for transmitting digital audio and video data according to the present invention includes steps of receiving predetermined signals and mode signals in order to transmit a stream of source packets, and outputting signals for generating transmission basis signals corresponding to the predetermined signals and the mode signals; and receiving the transmission basis signals and cycle sync generated at each predetermined lengths of time, and transmitting the packets in accordance with predetermined conditions.

According to the predetermined conditions, when one cycle sync occurs in a transmission basis signal interval, a packet with source packet data is transmitted at the cycle sync, and when two cycle syncs occur in a transmission basis signal interval, a packet with source packet data is transmitted at only one of the two cycle syncs and an empty packet without data is transmitted at the other cycle sync.

The features and objects of the present invention will be apparent from the following description of a preferred embodiment thereof and from the accompanying drawings.

DETAILED DESCRIPTION OF THE PREFERRED EMBODIMENTS

Figure 5:
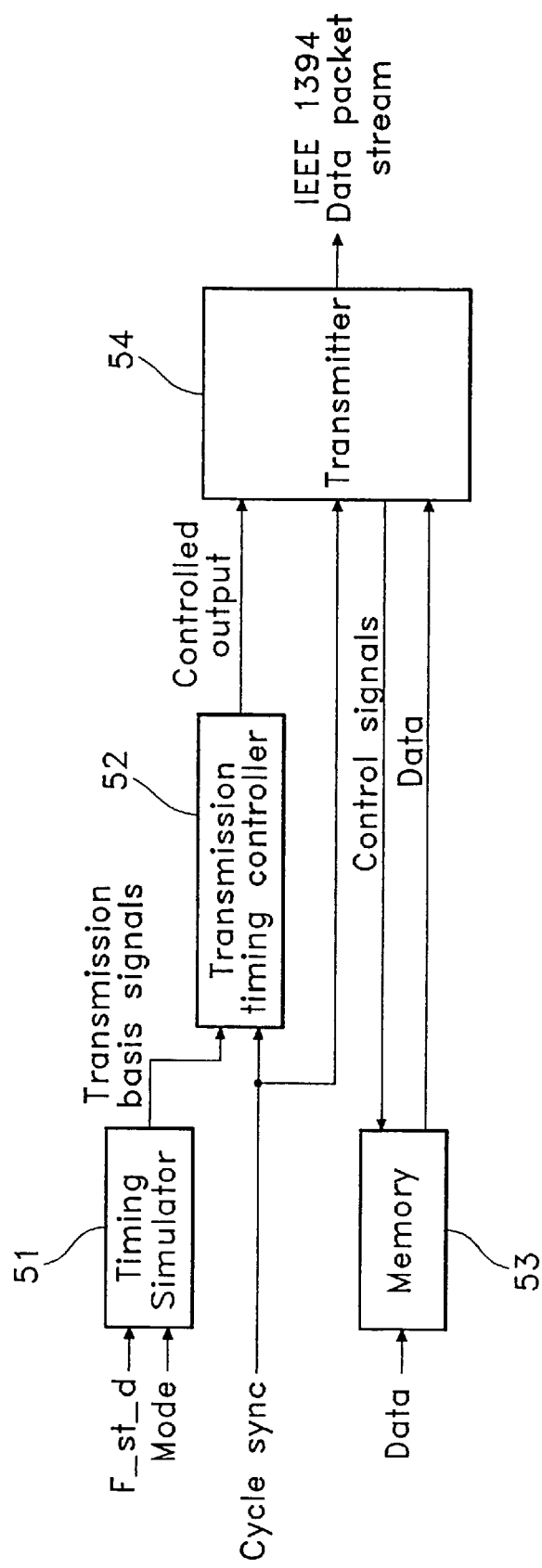
FIG. 5 is a block diagram of a device for transmitting audio and/or video data according to the present invention.

Technical terms used throughout the following description are defined on the basis of the function of the present invention. Therefore, the terms may be substituted by other appropriate terms within the understanding of those skilled in this art FIG. 5 is a block diagram of a device for transmitting audio and/or video data according to the present invention. As shown in the drawing, the invention includes: a timing simulator 51 for outputting transmission basis signals; a transmission timing controller 52 for generating controlled output for transmitting packets at every cycle sync; a memory 53 for temporarily storing data to be transmitted; and a transmitter 54 for receiving the data from the memory 53, and composing and transmitting packets according to the controlled output and the cycle sync.

The timing simulator 51 receives a frame start delay signal F_st_d signal that is obtained by delaying a frame start signal F_st signal, corresponding to the beginning of the transmission of the first source packet in a frame of the inner bus of a camcorder, by a predetermined length of time. The timing simulator 51 also receives mode signals indicating whether the data is in NTSC mode or in PAL mode. The timing simulator 51 then outputs transmission basis signals according to the F_st_d signals and the mode signals.

The transmission timing controller 52 receives the transmission basis signals and generates controlled output for transmitting packets at every cycle sync occurring every 125 μs, such that when a cycle sync occurs in a transmission basis signal interval, a packet with source packet data is transmitted at the cycle sync and when two cycle syncs occur in a transmission basis signal interval, a packet with source packet data is transmitted at only one of the two cycle syncs and an empty packet without data is transmitted at the other cycle sync.

Figure 1:
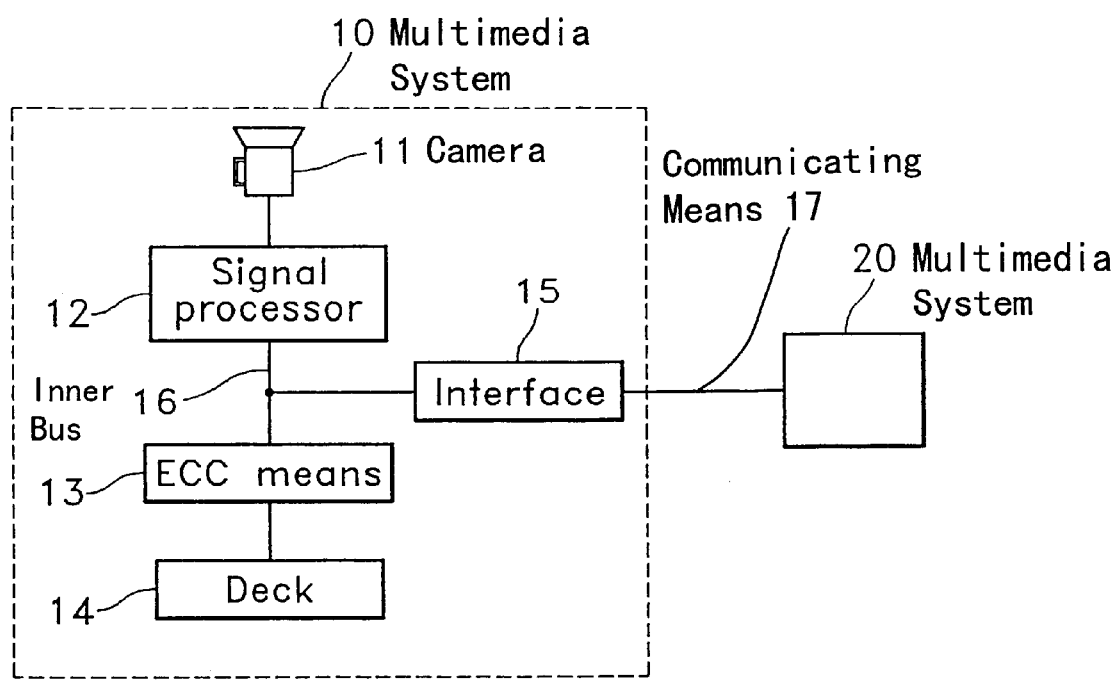
FIG. 1 is a block diagram of a multimedia system for data-communication with a common digital camcorder through an IEEE 1394 interface.
Figure 2:
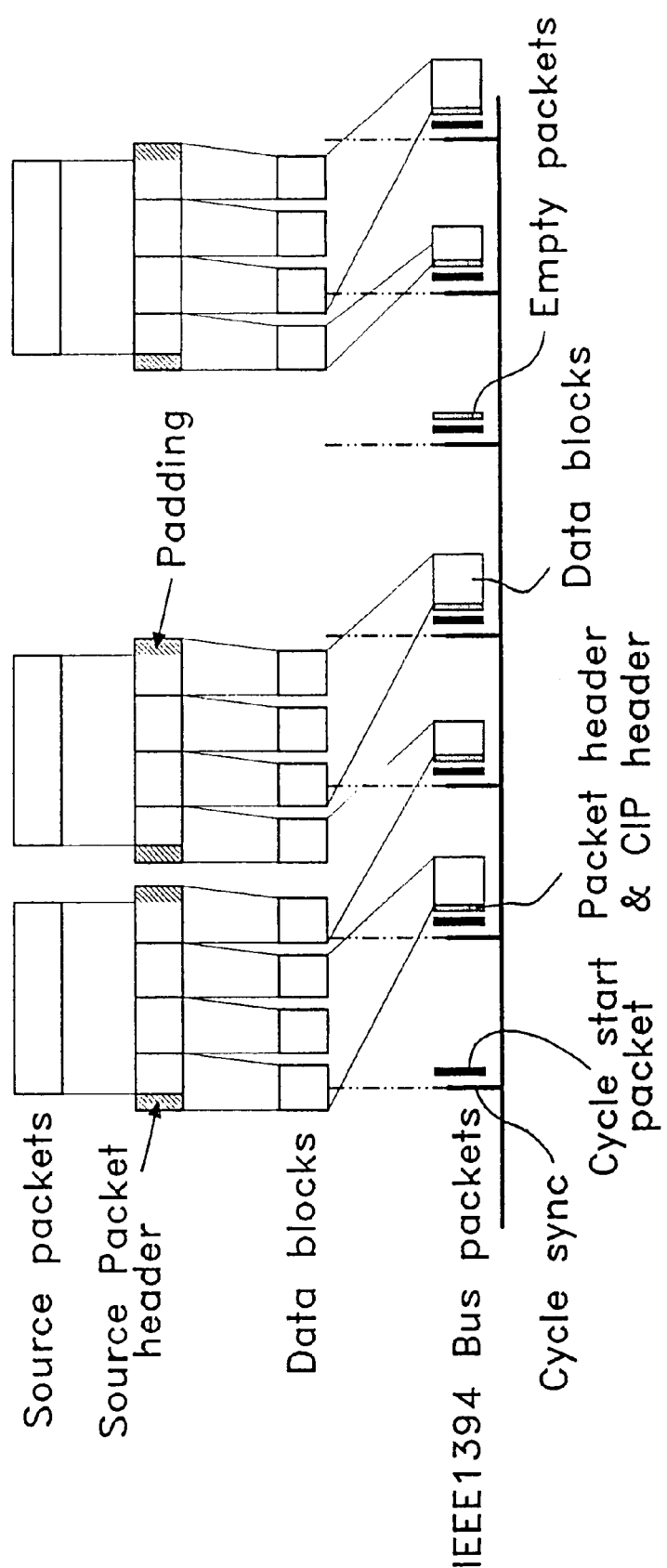
FIG. 2 is a model of the transmission scheme for communication a stream of source packets from one digital device to another digital device.
Figure 3:
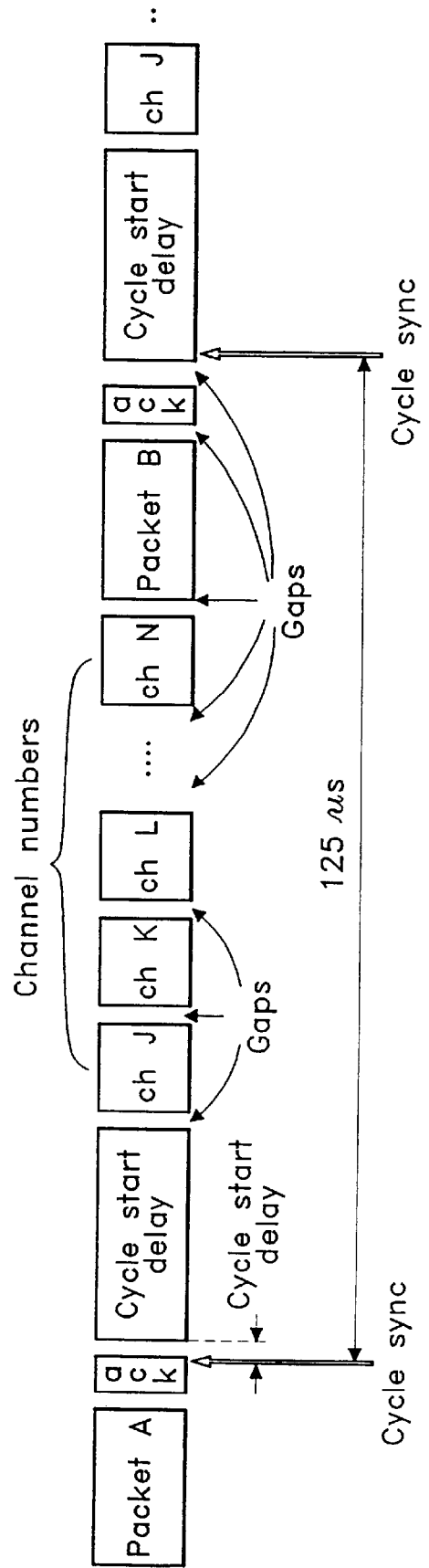
FIG. 3 is a timing chart of a cycle structure according to IEEE 1394.
Figure 4:
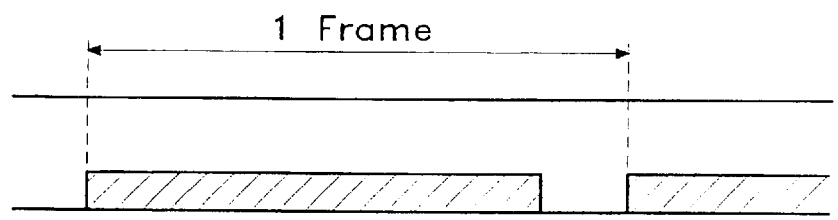
FIG. 4 is a timing chart of the state of the inner bus of a digital device during transmission of the data in one frame.
Figure 6:
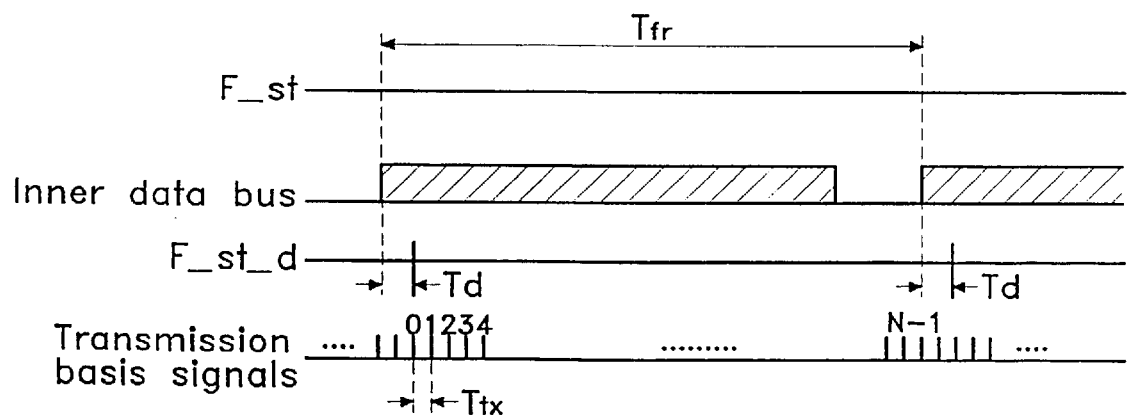
FIG. 6 is a timing chart of operation of a timing simulator of the device in FIG. 5.

Referring to FIG. 6, the timing simulator outputs transmission basis signals at every $T_{tx}$ interval according to the signal mode (NTSC mode or PAL mode). $T_{tx}$ represents a time fragment of a frame divided into 250 or 300 source packets. Td in FIG. 6 shows a time delay for filling the memory 53 with transmission data to buffer the transmission data. Operators may determine the length of this delay, which may be used for buffering the data in a memory.

In other words, the operator determines a length of time as the time delay that is consumed to store data in the memory 53 so that the transmitter of the present invention does not cause underflow during the transmission of the data. Such time delay is determined in accordance with the data transfer rate of the inner data bus of a digital system (e.g., camcorder) that is going to transmit the data.

In a preferred embodiment of the present invention, the consumed time (i.e., the time delay $T_d$) is the length of time taken to store one source packet in the memory 53.

To allow the operator to determine the time delay $T_d$, the present invention includes: an input device (not shown) for receiving the time delay $T_d$ from the outside; and a timing controller (not shown) for generating a frame start signal F__st signal, corresponding to the beginning of the transmission of the first source packet in a frame of the inner data bus, and generating a frame start delay signal F__st__d signal that is obtained by delaying the F__st signal by the time delay $T_d$ and inputting the F__st__d signal into the timing simulator 52.

Figure 7:
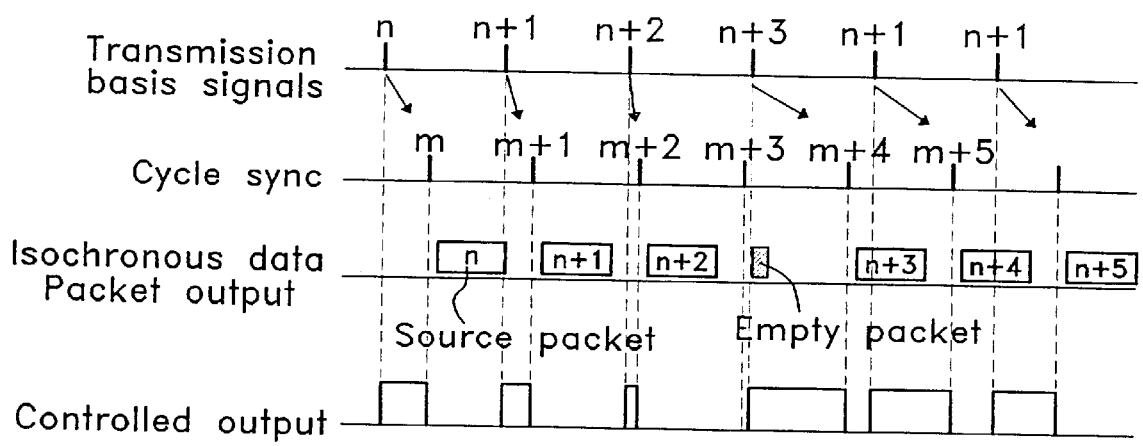
FIG. 7 is a timing chart of operation of a transmission timing controller and a transmitter of the device in FIG. 5.

FIG. 7 is a timing chart of operation of the transmission timing controller 52 and the transmitter 54. As shown in the drawing, a cycle of the transmission basis signal is 133.5 µs in 525–60 system (i.e., NTSC system) and is 133.3 µs in 625–60 system (i.e., PAL system). In both systems, the cycle of the transmission basis signal is longer than the cycle of the cycle sync for the IEEE 1394, which is 125 µs.

The transmission timing controller 52 generates controlled output signals which are set (i.e., shown as rising edges in FIG. 7) responsive to transmission basis signals and are reset (i.e., shown as falling edges in FIG. 7) responsive to cycle syncs.

The transmitter 54 transmits packets at every cycle sync such that when the controlled output signal is in the reset state, an empty packet without data is transmitted through a communication wire (not shown) and when the controlled output signal is in the set state, a packet with data that is read from the memory 53 is transmitted through the communication wire (not shown).

System clocks supplied to the respective blocks according to the present invention shown in FIG. 5 are commonly known in digital circuits, which is therefore omitted in the timing chart of FIG. 7.

Referring to FIG. 7, the transmission of the data packets and the empty packets will be described.

As aforementioned, since the cycle of transmission basis signal is longer than the cycle of the cycle sync. Therefore one or two cycle syncs may occur in a transmission basis signal interval.

Therefore, according to the present invention, at the first cycle sync after an $n^{th}$ transmission basis signal following the frame start delay signal F__st__d, an $n^{th}$ source packet is transmitted. At the first cycle sync after $(n+2)^{th}$ transmission basis signal, an $(n+2)^{th}$ source packet is transmitted and at the second cycle sync (shown as $(m+3)^{th}$ cycle sync) after the transmission basis signal, an empty packet is transmitted. In this manner, the invention can control the data distribution in a predetermined margin and provide a uniform data transfer rate defined with respect to SD-VCR DIF.

While there have been shown what are presently considered to be preferred embodiments of the invention, it will be apparent to those skilled in the art that various changes and modifications can be made without departing from the scope of the invention as defined by the appended claims.

For example, a value of the frame start delay F__st__d inputted into the timing simulator 51 and a value for designating the mode of a color television transmit-receive mode (e.g., NTSC, PAL, and so on) may be predesignated in the timing simulator 51.

Therefore various embodiments according to the present invention may be made within the scope and spirit of the present invention by anyone skilled in the art.

As discussed above, the device and method for transmitting digital audio and/or video data is capable of making the different data transfer rates of the inner bus of the digital device (e.g., a camcorder) and IEEE 1394 bus corresponding to the data transfer rate defined with respect to SD-VCR DIF, thereby satisfying the specifications for an SD-format digital interface.

What I claim is:

1. A device for transmitting digital audio and video data, which transmits a stream of source packets from a first digital device to a second digital device according to a transmission specification, said transmission specification defining an isochronous transmission mode, comprising:
    a timing simulator operative to receive predetermined signals and a predetermined mode signal in order to transmit a stream of the source packets, and to output transmission basis signals corresponding to the predetermined signals and the mode signal:
    a memory for storing the source packets;
    a transmission timing controller operative to receive the transmission basis signals and cycle syncs generated every predetermined length of time, and to generate a controlled output comprising empty packets, for controlling the transmission of packets according to predetermined rules defined by said transmission specification: and
    a transmitter operative to insert the empty packets in required positions between said source packets delivered from said memory as determined by said transmission timing controller and to transmit said source and empty packets in accordance with said transmission specification.

2. The device of claim 1, wherein said predetermined signals are generated after a predetermined length of time after a signal, indicating that a first source packet begins to be transmitted in a frame of the inner bus of the first digital device, is generated within said first digital device.

3. The device of claim 2, wherein said predetermined length of time is a length of time taken to store one of the source packets in said memory.

4. The device of claims 2 or 3, wherein said transmission time controlling means further comprises:
    inputting means for inputting said predetermined length of time from outside in order to determine said predetermined length of time; and
    timing controlling means for generating said predetermined signals after said predetermined length of time.

5. The device of claim 1, wherein said predetermined mode signal indicates whether the data is in NTSC (National Television System Committee) mode.

6. The device of claim 1, wherein said predetermined mode signal 2 indicates whether the data is in PAL (Phase Alternation Line) mode.

7. The device of claim 1, wherein said predetermined length of time is 125 µs.

8. The device of claim 1, wherein said timing simulator outputs transmission basis signals, corresponding to said predetermined signals and said mode signal, for transmitting a stream of the source packets, said predetermined signals and said mode signal being predesignated signals not newly inputted signals.

9. The device of claim 1, wherein, according to said predetermined rules, when one cycle sync occurs in a transmission basis signal interval, a packet with source packet data that is valid in the cycle sync is transmitted at the cycle sync, and when two cycle syncs occur in a transmission basis signal interval, a packet with source packet data is transmitted at only one of the two cycle syncs and an empty packet without data is transmitted at the other cycle sync.

10. The device of claim 9, wherein said transmission basis signal interval is a cycle interval that is a time fragment of a frame divided into 250 when in NTSC mode.

11. The device of claim 9, wherein said transmission basis signal interval is a cycle interval that is a time fragment of a frame divided into 300 when in PAL mode.

12. The device of claim 1, wherein said transmission specification is IEEE 1394.

13. A method for transmitting a stream of source packets from a first digital device to a second digital device according to a transmission specification said transmission specification defining an isochronous transmission mode, comprising the steps of:

receiving predetermined signals and a predetermined mode signal in order to transmit said stream of the source packets, and outputting transmission basis signals corresponding to said predetermined signals and said mode signal; and receiving said transmission basis signals and cycle syncs generated every predetermined time period, and transmitting said source packets and empty packets according to predetermined rules defined by said transmission specification, wherein, according to said predetermined rules, when one cycle sync occurs in a transmission basis signal interval, a packet with source packet data that is valid in the cycle sync is transmitted at the cycle sync, and when two cycle syncs occur in a transmission basis signal interval, a packet with source packet data is transmitted at only one of the two cycle syncs and an empty packet without data is transmitted at the other cycle sync.

14. The method of claim 13, wherein said predetermined signals are generated after a predetermined length of time after a signal, indicating that a first source packet begins to be transmitted in a frame of the inner bus of the first digital device, is generated.

15. The method of claim 14, wherein said predetermined length of time is a length of time taken to store one of the source packets in said memory.

16. The method of claim 15, wherein said predetermined length of time is determined by an operator.

17. The method of claim 13, wherein said predetermined mode signal indicates whether the data is in NTSC (National Television System Committee) mode.

18. The method of claim 13, wherein said predetermined mode signal indicates whether the data is in PAL (Phase Alternation Line) mode.

19. The method of claim 13, wherein said predetermined length of time is 125 $\mu$s.

20. The method of claim 13, wherein said transmission basis signal interval is a cycle interval that is a time fragment of a frame divided into 250 when in NTSC mode.

21. The method of claim 13, wherein, said transmission basis signal interval is a cycle interval that is a time fragment of a frame divided into 300 when in PAL mode.

22. The method of claim 13, wherein said transmission specification is IEEE 1394.

23. The method of claim 13, wherein said transmission basis signals outputting step including a step for outputting transmission basis signals, corresponding to said predetermined signals and said mode signals, for transmitting a stream of said source packets, said predetermined signals and said mode signals being predesignated signals not newly inputted signals.

* * * * *